United States Patent
Blizzard

(10) Patent No.: US 11,045,780 B2
(45) Date of Patent: Jun. 29, 2021

(54) METHOD OF ENCAPSULATING PARTICULATE MATERIAL

(71) Applicant: Quadsil, Inc., Midland, MI (US)

(72) Inventor: John D. Blizzard, Bay City, MI (US)

(73) Assignee: Quadsil, Inc., Midland, MI (US)

( * ) Notice: Subject to any disclaimer, the term of this patent is extended or adjusted under 35 U.S.C. 154(b) by 0 days.

(21) Appl. No.: 16/713,613

(22) Filed: Dec. 13, 2019

(65) Prior Publication Data

US 2020/0114331 A1 Apr. 16, 2020

Related U.S. Application Data

(62) Division of application No. 15/080,698, filed on Mar. 25, 2016, now Pat. No. 10,543,472, which is a division of application No. 12/930,070, filed on Dec. 24, 2010, now abandoned.

(60) Provisional application No. 61/284,818, filed on Dec. 24, 2009.

(51) Int. Cl.
*B01J 13/22* (2006.01)
*B01J 13/06* (2006.01)
*B01J 13/18* (2006.01)

(52) U.S. Cl.
CPC ............... *B01J 13/22* (2013.01); *B01J 13/06* (2013.01); *B01J 13/18* (2013.01); *Y10T 428/2989* (2015.01)

(58) Field of Classification Search
None
See application file for complete search history.

(56) References Cited

U.S. PATENT DOCUMENTS

| 5,989,767 A * | 11/1999 | Yoerger | G03G 9/1139 430/111.32 |
| 6,337,089 B1 * | 1/2002 | Yoshioka | A61K 8/11 424/400 |
| 6,447,907 B1 * | 9/2002 | Wolter | A61L 24/0089 428/402 |
| 10,543,472 B2 | 1/2020 | Blizzard | |
| 2011/0159289 A1 * | 6/2011 | Blizzard | B01J 13/18 428/402.24 |

* cited by examiner

*Primary Examiner* — Jeffrey D Washville
(74) *Attorney, Agent, or Firm* — Brenda J. Kruse

(57) ABSTRACT

A method of encapsulating particulate materials. The method of encapsulating particulate materials may be used to multi coat a coated thermoplastic particle. The method includes providing an amount of acidified water in an amount to hydrolyze a pre-determined amount of alkoxysilane. A particulate thermoplastic material is dispersed within the acidified water. Once dispersed, an amount of alkoxysilane having a pre-determined formula is added and an amount of time is allowed to pass thereby allowing the alkoxysilane to hydrolyze and build a particle having a pre-determined particle size. Once the particle with pre-determined particle size has been obtained, the particles may be combined with alkoxysilane having a pre-determined formula and an amount of time is allowed to pass thereby allowing the alkoxysilane to hydrolyze and build a particle having a pre-determined particle size. This provides an encapsulated particulate material having one or more coatings thereon.

8 Claims, No Drawings

METHOD OF ENCAPSULATING PARTICULATE MATERIAL

CROSS-REFERENCE TO RELATED APPLICATIONS

The present application claims the benefit of and is a divisional patent application of U.S. patent application Ser. No. 15/080,698 filed on Mar. 25, 2016, which is a divisional patent application of U.S. patent application Ser. No. 12/930,070 filed on Dec. 24, 2010, now abandoned, which claimed the benefit of U.S. Provisional Patent Application No. 61/284,818 filed on Dec. 24, 2009, all of which are incorporated herein by reference in their entirety.

FIELD OF THE DISCLOSURE

The present disclosure relates to a method of encapsulating a particulate material. Additionally, the present disclosure relates to a method of providing an encapsulated material having one or more coatings thereon.

BACKGROUND OF THE DISCLOSURE

Encapsulation of particulates and liquid materials has been known for a number of years. Such materials most usually encapsulated are fragrances, shampoos, cosmetics, colorants, catalysts, laundry detergents and soaps, personal care products, textiles, active ingredients, auto care products, and the like.

SUMMARY OF THE DISCLOSURE

A method of encapsulating particulate materials. The method of encapsulating particulate materials may be used to multi coat a coated thermoplastic particle. The method includes providing an amount of acidified water in an amount to hydrolyze a pre-determined amount of alkoxysilane. A particulate thermoplastic material is dispersed within the acidified water. Once dispersed, an amount of alkoxysilane having a pre-determined formula is added and an amount of time is allowed to pass thereby allowing the alkoxysilane to hydrolyze and build a particle having a pre-determined particle size. Once the particle with pre-determined particle size has been obtained, the particles may be combined with alkoxysilane having a pre-determined formula and an amount of time is allowed to pass thereby allowing the alkoxysilane to hydrolyze and build a particle having a pre-determined particle size. This provides an encapsulated particulate material having one or more coatings thereon.

The invention disclosed and claimed herein is a method of encapsulating particulate materials. The method comprises providing acidified water at least sufficient for hydrolyzing a predetermined amount of alkoxysilane.

Then, at least one type of particulate material is dispersed in the acidified water and there is slowly added a predetermined amount of alkoxysilane having the general formula;

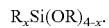

wherein the substituents are selected from the group consisting of fluorine, amino, hydroxy, and combinations thereof.

Thereafter, sufficient time is allowed for the alkoxysilane to hydrolyze and build a predetermined particle size and then the dispersion is optionally neutralized with a base. Subsequent steps include the work up of the product. It is best if larger amounts of water are used during the sol gel formation to prevent gelation of the sol care being taken to minimize the amount of water as the excess water must be removed from the reaction mass at the end of the reaction. Any solids in the dispersion are dried. The dried solids may be ground into a fine powder for use in a number of end use applications.

DETAILED DESCRIPTION OF THE DISCLOSURE

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

It should be further noted that the encapsulation reaction is run at or near room temperature and therefore, there is no need for any heating or cooling equipment.

The reaction of this may be run in less than twenty-four hours and preferred is a reaction time of less than 10 hours, and a most preferred time is a reaction time of less than 3 hours.

There is a requirement that the stoichiometry be observed between the amount of water in the reaction system and the amount of alkoxysilane in the system in order to carefully control the condensation reaction of the sol gel that is being formed, to achieve the desires results.

It is best if the alkoxysilane is added in small portions, that is, "slowly". Introducing the alkoxysilane too quickly will result in adverse results, i.e. gelation of the reaction mass.

Adding the alkoxysilane in smaller portions will allow the sol gel to build to the appropriate particle size. This is a critical step in the method, as a particle size that is too small will not encapsulate the particle and a particle size that is too large will cause premature precipitation and gelling. Defining the size of the particle can be determined by watching the reaction medium. The building of the particle can be observed and thus if the alkoxysilane is added too slowly, no particles other than the particle to be encapsulated will be visible while elements of gelling can be observed if the addition is too rapid. As long as one observes the reaction carefully, slight amounts of these two conditions can be remedied by adjustment of the addition rate either more or less.

The condensation reaction can be represented by the following chemical equation:

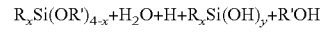

wherein R is an alkyl group, a substituted alkyl group, an aryl group, a substituted aryl group, vinyl, allyl or hydrogen. Alkyl groups are those such as methyl, ethyl, propyl, amyl, etc. Aryl groups are selected from phenyl and tolyl. Substituted groups are selected from the group consisting of fluorine, amino groups, hydroxyl groups, and combinations thereof. R' is selected from hydrogen and alkyl groups of 1 to 4 carbon atoms.

The reaction mass is subjected to mild temperatures to remove the water and dry the sample, such as 50° C. or lower, although this temperature is not overly critical. One should take caution not to melt the encapsulated particle.

If one wishes to use the encapsulated particles in an end use formulation that uses water as part of the formulation, it may not be necessary to remove the water, or it may be necessary to remove some of the water but not dry out the sample completely.

Thereafter, the dried sample may be subjected to grinding to reduce the size of the particles. The size of the ground particle is dependent on the users end use, however, it has been found that grinding the encapsulated particles to the size of table salt is the most useful, producing a flowable product.

In an effort to minimize the amount of water used in the method, one must determine the solubility of the particulate solid in water (Ksp).

It is also contemplated within the scope of this disclosure to perform an encapsulation on an encapsulated material of this disclosure in order to produce an added-to coating thereon, much like producing an onion.

EXAMPLES

Various metal salt solid particles were encapsulated by the method described herein in the following manner by first determining their Ksp. (Table I)

TABLE I

| Metal Salt | Ksp |
|---|---|
| Potassium chloride (KCl) | total soluability |
| Copper Chloride ($CuCl_2$) | 70.6 gm/100 ml |
| Lithium Chloride (LiCl) | 76.9 gm/100 ml |
| Barium Chloride ($BaCl_2$) | 31 gm/100 ml |
| Zinc Chloride ($ZnCl_2$) | 81 gm/100 ml |

It is necessary to determine the solubility constant (Ksp) of each of the metallic particles, as a stoichiometric amount of water is required to properly form the sol gel and the water is also necessary to dissociate the metallic salt in the mixture. Further, it is unknown what effect the free chloride from the dissociation of the metallic salt will have on the sol gel formation.

Example 1

Potassium chloride was dissolve in acidified water. Thereafter, methyltrimethoxysilane was slowly added to allow for the hydrolysis of the alkoxy silane. The methyltrimethoxysilane was added in two equal portions to allow the sol gel to build to the appropriate particle size. After the reaction, the sol gel was neutralized to cause the precipitation of the matrix. The sample was oven dried at 45° C. overnight to remove the water followed by grinding the resulting metallic salt sol gel to a powder about the size of table salt.

Example 2

To a 200 ml beaker, 35 grams of distilled water was added. To this water, 8 grams of lithium chloride was added with agitation. The temperature of the distilled water was measured at 23° C. During dissociation of the lithium chloride the temperature rose to 60 degrees, an exotherm of 37 degrees centigrade. After cooling back to 23 degrees, 2.3 grams of Dow Corning 6070 silane (methyltrimethoxysilane—Dow Corning Corporation, Midland, Mich.) was added drop wise and allowed to mix and hydrolyze. After continuous mixing for 60 minutes, 2.3 grams of Dow Corning 6070 silane was added drop wise and allowed to mix for 120 minutes. The resulting reaction product was filtered through filter paper to collect the encapsulated metal salt. This was dried for 16 hours at 45° C. resulting in a white crystalline powder. This powder was placed in a porcelain crucible and ground to a fine white powder about the size of table salt.

Thereafter, each of the sol gel versions of the salts set forth in TABLE I above, were produced by virtually the same procedure. The results can be found in TABLE II provided below.

TABLE II

| | SAMPLE # | | | | | |
|---|---|---|---|---|---|---|
| | 1 | 2 | 3 | 4 | 5 | Solubility |
| Water | 35 | 35 | 35 | 35 | 35 | |
| Potassium | 8 | | | | | INDEFINATE |
| Copper | | 8 | | | | 70.6/100 ml |
| Lithium | | | 8 | | | 76.9/100 ml |
| Barium | | | | 8 | | 31/100 ml |
| Zinc | | | | | 8 | 81/100 ml |
| MTM[1] | 2.3 | 23 | 2.3 | 2.3 | 2.3 | |
| MTM[2] | 2.3 | 2.3 | 2.3 | 2.3 | 2.3 | |
| NaOH | 1.2 | 1.2 | 0 | 1.2 | 0 | |
| Product | 3 gms | 3 gms | | 3 gms | | |
| Water | 15 gms | 15 gms | | 15 gms | | |
| Dry Weight | 0.46 g | 0.61 g | | 0.26 g | | |

[1]first addition of methyltrimethoxysilane
[2]second addition of methyltrimethoxysilane Table III shows additional reactions.

TABLE III

| | 1 | 2 | 3 | 4 | 5 |
|---|---|---|---|---|---|
| Water | 175 | 175 | 175 | 175 | 175 |
| K | 40 | | | | |
| Cu | | 40 | | | |
| Li | | | 40 | | |
| Ba | | | | 40 | |
| Zn | | | | | 40 |

TABLE III-continued

| | 1 | 2 | 3 | 4 | 5 |
|---|---|---|---|---|---|
| RXN[1] | ENDO | ENDO | ENDO | ENDO | ENDO |
| MTM | 11.5 | 11.5 | 11.5 | 11.5 | 11.5 |
| MTM | 11.5 | 11.5 | 11.5 | 11.5 | 11.5 |
| NaOH | 6 | 6 | 6 | 6 | 6 |
| Solution Color | OPAQUE | BLUE/GREEN | OPAQUE | OPAQUE | OPAQUE |
| Exotherm Temperature ° C. | | 40 | 60 | 17 | |

Table IV has additional reaction data demonstrating a reduction in the amount of water required for the sol gel formation.

TABLE IV

| | 1 | 2 | 3 |
|---|---|---|---|
| Water | 35 | 35 | 35 |
| Cu | | | 28 |
| Li | 30.4 | | |
| Ba | | | 11.7 |
| MTM | 8.7 | 8.7 | 8.7 |
| MTM | 8.7 | 8.7 | 8.7 |
| EXO TEMP. ° C. | 60 | 40 | 17 |
| SOLN pH | | 2 | 6 |

Table V has additional data showing the double coating technique. The encapsulated material from experiment 1 of table V was used herein. The water and lithium chloride was allowed to equilibrate and a sample of the final product was added to this mixture. The product from experiment 1 of table IV was not soluble in the water solution. However, upon the additional of the first quantity of methyltrimethoxysilane, the material was able to go into solution. The second addition of methyltrimethoxysilane completed the final encapsulation product.

TABLE V

| | 1 |
|---|---|
| Water | 17.5 |
| Li | 15.7 |
| MTM | 4.35 |
| MTM | 3.35 |
| SAMPLE 1 | |
| FROM TABLE V | 5.0 |
| EXO TEMP ° C. | 67 |
| SOLUTION pH | 4 |

It is to be understood that the various embodiments described in this specification are simply exemplary embodiments illustrating the inventive concepts as defined in the claims. As a result, it is to be understood that the various embodiments described and illustrated herein may be combined to from the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A method of encapsulating particulate materials, said method consisting of:
   a. providing acidified water at least sufficient for hydrolyzing a predetermined amount of alkoxysilane;
   b. thereafter, dispersing at least one type of particulate material in said acidified water;
   c. thereafter, slowly adding a predetermined amount of alkoxysilane having the general formula:

$R_xSi(OR')_{4-x}$ wherein R is selected from the group consisting essentially of alkyl groups, substituted alkyl groups, aryl groups, substituted aryl groups, vinyl, allyl, and hydrogen,
   wherein the substituents are selected from the group consisting of fluorine, amino, hydroxy, and combinations thereof, and
   wherein R' is selected from hydrogen and alkyl groups of 1 to 4 carbon atoms;
   d. thereafter, allowing sufficient time for said alkoxysilane to hydrolyze and build a predetermined particle size;
   e. thereafter, treating said product from d. by slowly adding a predetermined amount of alkoxysilane having the general formula:

$R_xSi(OR')_{4-x}$ wherein R is selected from the group consisting essentially of alkyl groups, substituted alkyl groups, aryl groups, substituted aryl groups, vinyl, allyl, and hydrogen,
   wherein the substituents are selected from the group consisting of fluorine, amino, hydroxy, and combinations thereof, and
   wherein R' is selected from hydrogen and alkyl groups of 1 to 4 carbon atoms;
   f. thereafter, allowing sufficient time for said alkoxysilane to hydrolyze and build a predetermined particle size.

2. The method of claim 1, wherein more than two coats are provided for an encapsulated material.

3. The method of claim 1, wherein said method is performed in the absence of a cross linkers, catalyst, surfactants, solvents, or any other adjuvants to facilitate encapsulation of said particulate material.

4. The method of claim 1, further comprising the step of neutralizing said product of step f. with a base.

5. The method of claim 1, further comprising the steps of removing water from said dispersal and allowing an amount of solids within said dispersion to be dried.

6. The method of claim 5, wherein said dried solids are ground to a pre-determined particle size.

7. The method of claim 1, wherein said steps e. and f. are repeated as needed to provide additional coats onto said encapsulated particulate material.

8. An encapsulated particulate material prepared by the method of claim 1.

* * * * *